US012679328B2

(12) United States Patent
Blakesley et al.

(10) Patent No.: US 12,679,328 B2
(45) Date of Patent: Jul. 14, 2026

(54) CONTROL SYSTEM AND METHOD FOR CONTROLLING ELECTRICAL POWER CONSUMPTION BY TRACTION MOTOR CAUSED BY WHEEL SLIP

(71) Applicant: JAGUAR LAND ROVER LIMITED, Coventry (GB)

(72) Inventors: Christopher Blakesley, Coventry (GB); William Harrison, Coventry (GB); Olivier Roques, Coventry (GB); Gareth Jones, Coventry (GB); Stuart Dawes, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 224 days.

(21) Appl. No.: 17/996,922

(22) PCT Filed: Apr. 21, 2021

(86) PCT No.: PCT/EP2021/060434
§ 371 (c)(1),
(2) Date: Oct. 21, 2022

(87) PCT Pub. No.: WO2021/214169
PCT Pub. Date: Oct. 28, 2021

(65) Prior Publication Data
US 2023/0159017 A1 May 25, 2023

(30) Foreign Application Priority Data
Apr. 21, 2020 (GB) ...................................... 2005809

(51) Int. Cl.
*B60W 20/13* (2016.01)
*B60W 10/08* (2006.01)
*B60W 10/26* (2006.01)

(52) U.S. Cl.
CPC ............ *B60W 20/13* (2016.01); *B60W 10/08* (2013.01); *B60W 10/26* (2013.01);
(Continued)

(58) Field of Classification Search
None
See application file for complete search history.

(56) References Cited

U.S. PATENT DOCUMENTS 7,739,005 B1 * 6/2010 Tang ......................... B60L 3/10
701/69
9,139,088 B2 * 9/2015 Okubo ................... B60K 28/16
(Continued)

FOREIGN PATENT DOCUMENTS

EP 2700532 A1 2/2014
GB 2538806 A 11/2016

OTHER PUBLICATIONS

ISA European Patent Office, International Search Report and Written Opinion Issued in Application No. PCT/EP2021/060434, Jul. 15, 2021, WIPO, 15 pages.
Great Britain Intellectual Property Office, Combined Search and Examination Report under Sections 17 and 18(3) Issued in Application No. GB2005809.5, Sep. 18, 2020, 6 pages.
(Continued)

*Primary Examiner* — Angela Y Ortiz
*Assistant Examiner* — Torrence S Marunda, II
(74) *Attorney, Agent, or Firm* — McCoy Russell LLP

(57) ABSTRACT
A control system for controlling electrical power consumption from energy storage means by a traction motor of a vehicle caused by a wheel slip event includes: one or more electronic controllers configured to: receive a torque request for the traction motor; determine a current known prevailing speed value of the traction motor; determine a maximum allowable increase in speed of the traction motor of to occur during a latency period associated with the prevailing speed value of the current known speed of the traction motor; determine an electrical power consumption limit in depen-
(Continued)

dence on the torque request, the current known prevailing speed value of the traction motor of the vehicle and the maximum allowable increase in speed of the traction motor; and control torque provision of the traction motor in dependence on the torque request and the electrical power consumption limit.

16 Claims, 4 Drawing Sheets

(52) U.S. Cl.
CPC . *B60W 2510/081* (2013.01); *B60W 2510/083* (2013.01); *B60W 2520/26* (2013.01); *B60W 2710/081* (2013.01); *B60W 2710/083* (2013.01); *B60W 2710/242* (2013.01)

(56) References Cited

U.S. PATENT DOCUMENTS

| | | | |
|---|---|---|---|
| 11,059,372 B2 * | 7/2021 | Hodgson | B60L 7/18 |
| 2004/0178756 A1 | 9/2004 | Zhenxing | |
| 2015/0105951 A1 | 4/2015 | Yu et al. | |
| 2015/0175010 A1 | 6/2015 | Tang | |
| 2015/0251541 A1 * | 9/2015 | Drako | B60L 3/106 |
| | | | 701/22 |
| 2016/0039405 A1 * | 2/2016 | Terayama | B60K 6/442 |
| | | | 903/906 |
| 2018/0086208 A1 | 3/2018 | Hodgson et al. | |

OTHER PUBLICATIONS

European Patent Office, Office Action Issued in Application No. 21721059.0, Apr. 9, 2024, Netherlands, 7 pages.

* cited by examiner

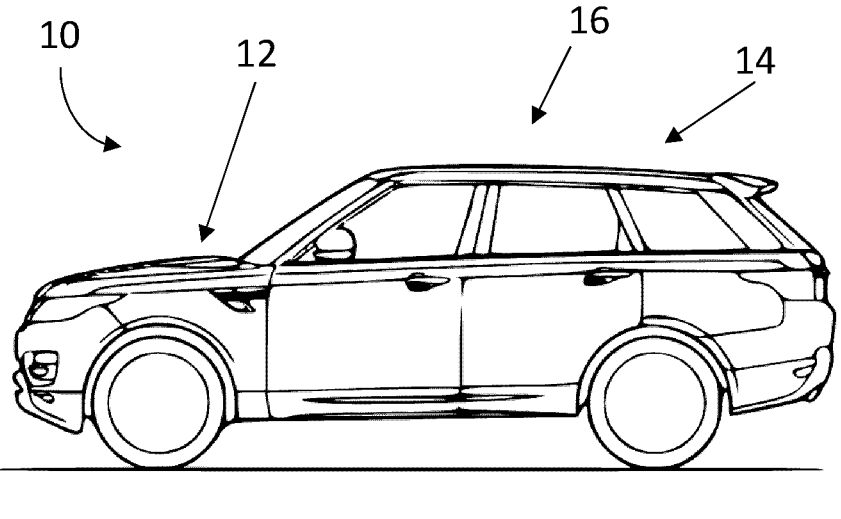
Fig 1
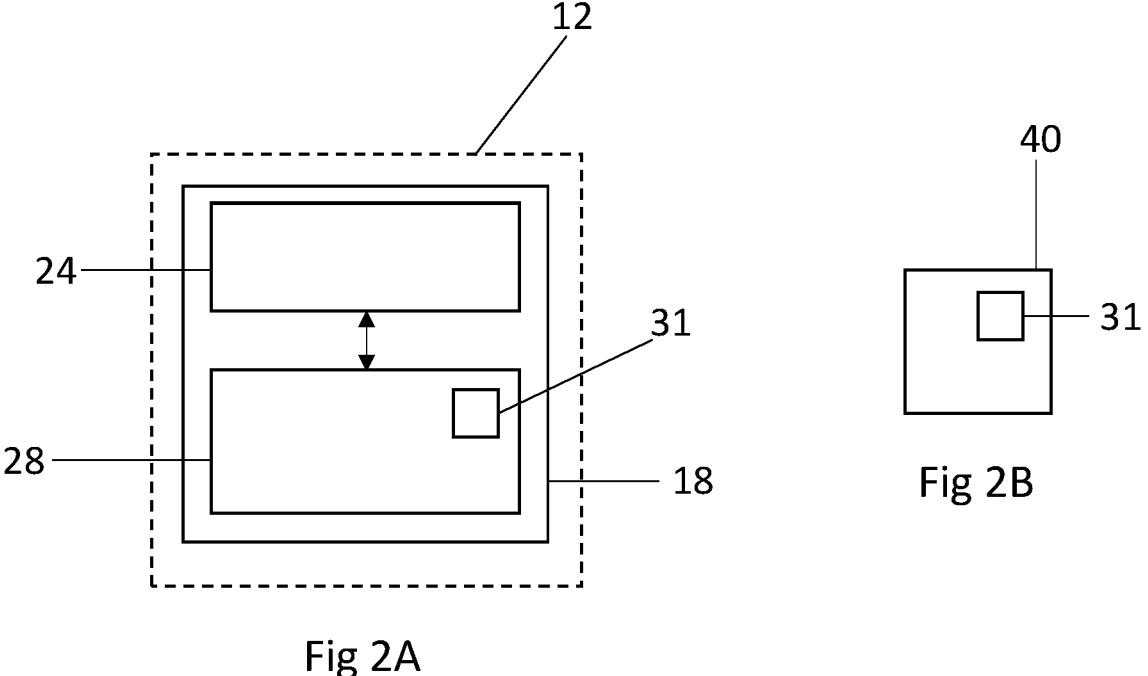
Fig 2A
Fig 2B

400

RECEIVE A TORQUE REQUEST FOR TRACTION MOTOR — 402

DETERMINE PREVAILING SPEED VALUE OF TRACTION MOTOR — 404

DETERMINE MAXIMUM ALLOWABLE INCREASE IN SPEED OF TRACTION MOTOR IN ASSOCIATED LATENCY PERIOD — 406

DETERMINE ELECTRICAL POWER CONSUMPTION LIMIT — 408

CONTROL TORQUE PROVISION OF THE TRACTION MOTOR — 410

CONTROL SYSTEM AND METHOD FOR CONTROLLING ELECTRICAL POWER CONSUMPTION BY TRACTION MOTOR CAUSED BY WHEEL SLIP

CROSS REFERENCE TO RELATED APPLICATIONS

The present application is a U.S. National Phase of International Application No. PCT/EP2021/060434 entitled "CONTROL SYSTEM AND METHOD FOR CONTROLLING ELECTRICAL POWER CONSUMPTION BY TRACTION MOTOR CAUSED BY WHEEL SLIP," and filed on Apr. 21, 2021. International Application No. PCT/EP2021/060434 claims priority to Great Britain Patent Application No. 2005809.5 filed on Apr. 21, 2020. The entire contents of each of the above-listed applications are hereby incorporated by reference for all purposes.

TECHNICAL FIELD

The present disclosure relates to controlling electrical power consumption caused by wheel slip. In particular, but not exclusively, it relates to controlling electrical power consumption from energy storage means by a traction motor of a vehicle caused by a wheel slip event.

BACKGROUND

While driving on surfaces with a variable coefficient of friction, for example, one or more wheels of a vehicle may slip and so accelerate.

Since the inertia of an electric drive system is relatively low compared with the inertia of a convention engine and transmission system, the speed of wheels powered by an electric drive system can increase rapidly during a wheel slip event.

In conventional traction control systems, driving torque is reduced as soon as slip is detected. Due to higher inertia in conventional engine and transmission systems the wheels do not reach high speeds and so the time to respond to the wheel slip event is not so critical and the decelerating power requirement is also not high.

However, in electric drive systems, due to the low inertia of the system, the wheels can accelerate rapidly during a wheel slip event causing a rapid increase of electrical power consumption that can, for example, exceed the capability of the traction battery to deliver the required power.

SUMMARY OF THE INVENTION

It is an aim of the present invention to address one or more of the disadvantages associated with the prior art.

Aspects and embodiments of the invention provide a control system, a vehicle system, a vehicle, a method, and computer software.

According to an aspect of the invention there is provided a control system for controlling electrical power consumption from energy storage means by a traction motor of a vehicle caused by a wheel slip event, the control system comprising one or more electronic controllers, the one or more electronic controllers configured to: receive a torque request for the traction motor; determine a prevailing speed value of the traction motor; determine a maximum allowable increase in speed of the traction motor to occur during a latency period associated with the prevailing speed value of the traction motor; determine an electrical power consumption limit in dependence on the torque request, the prevailing speed value of the traction motor and the maximum allowable increase in speed of the traction motor; and control torque provision of the traction motor in dependence on the torque request and the electrical power consumption limit.

The control system can prevent power consumption in excess of the capability of the battery. This can, therefore, prevent battery damage and/or intrusive battery protection features of a vehicle being activated.

The one or more controllers may collectively comprise: at least one electronic processor having an electrical input for receiving information associated with a torque request for the traction motor of the vehicle, determining a prevailing speed value of the traction motor, determining a maximum allowable increase in speed of the traction motor and determining an electrical power consumption limit; and at least one electronic memory device electrically coupled to the at least one electronic processor and having instructions stored therein; and wherein the at least one electronic processor is configured to access the at least one memory device and execute the instructions thereon so as to cause the control system to determine the prevailing speed value of the traction motor, determine the maximum allowable increase in speed of the traction motor, determine the electrical power consumption limit and control torque provision of the traction motor.

Determining a maximum allowable increase in speed of the traction motor may comprise determining a prevailing speed of the vehicle and determining the maximum allowable increase in speed of the traction motor in dependence on the prevailing speed of the vehicle.

Determining a maximum allowable increase in speed of the traction motor may comprise accessing at least one data structure in dependence on the prevailing speed of the vehicle.

Determining an electrical power consumption limit may comprise accessing at least one data structure in dependence on the torque request, the prevailing speed value of the traction motor and the maximum allowable increase in speed of the traction motor.

The at least one data structure may account for efficiencies in provision of torque by the traction motor.

The electrical power consumption limit may comprise a limit in terms of electrical current and/or power to be supplied to the traction motor.

The electrical power consumption limit may comprise a limit in terms of electrical current and/or power to be drawn from the energy storage means by the traction motor.

The latency period of the prevailing speed value of the traction motor may be approximately 50 to 100 milliseconds.

Controlling torque provision may comprise transmitting the torque request and electrical power consumption limit to control torque provision.

Controlling torque provision may comprise determining a speed value of the traction motor having a lower associated latency and determining a torque limit in dependence on the lower latency speed value of the traction motor, the torque request and the electrical power consumption limit.

According to an aspect of the invention there is provided a vehicle system comprising the control system, a traction motor and energy storage means.

According to an aspect of the invention there is provided a vehicle comprising the control system and/or the vehicle system.

According to an aspect of the invention there is provided a method for controlling electrical power consumption from energy storage means by a traction motor of a vehicle caused by a wheel slip event, the method comprising: receiving a torque request for the traction motor of the vehicle; determining a prevailing speed value of the traction motor; determining a maximum allowable increase in speed of the traction motor to occur during a latency period associated with the prevailing speed value of the traction motor; determining an electrical power consumption limit in dependence on the torque request, the prevailing speed value of the traction motor and the maximum allowable increase in speed of the traction motor; and controlling torque provision of the traction motor in dependence on the torque request and the electrical power consumption limit.

Determining a maximum allowable increase in speed of the traction motor may comprise determining a prevailing speed of the vehicle and determining the maximum allowable increase in speed of the traction motor in dependence on the prevailing speed of the vehicle.

Determining a maximum allowable increase in speed of the traction motor may comprise accessing at least one data structure in dependence on the prevailing speed of the vehicle.

Determining an electrical power consumption limit may comprise accessing at least one data structure in dependence on the torque request, the prevailing speed value of the traction motor and the maximum allowable increase in speed of the traction motor.

The at least one data structure may account for efficiencies in provision of torque by the traction motor.

The electrical power consumption limit may comprise a limit in terms of electrical current and/or power to be supplied to the traction motor.

The electrical power consumption limit may comprise a limit in terms of electrical current and/or power to be drawn from the energy storage means by the traction motor.

The latency period of the prevailing speed value of the traction motor may be approximately 50 to 100 milliseconds.

Controlling torque provision may comprise transmitting the torque request and electrical power consumption limit to control torque provision.

Controlling torque provision may comprise determining a speed value of the traction motor having a lower associated latency and determining a torque limit in dependence on the lower latency speed value of the traction motor, the torque request and the electrical power consumption limit.

According to an aspect of the invention there is provided a non-transitory computer readable medium comprising computer readable instructions that, when executed by a processor, perform the method of at least one or more methods described herein.

Within the scope of this application it is expressly intended that the various aspects, embodiments, examples and alternatives set out in the preceding paragraphs, in the following description and/or drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 1 illustrates an example of a vehicle;

FIG. 2A schematically illustrates an example of a control system;

FIG. 2B schematically illustrates an example of a non-transitory computer readable medium;

DETAILED DESCRIPTION

Figure 3:
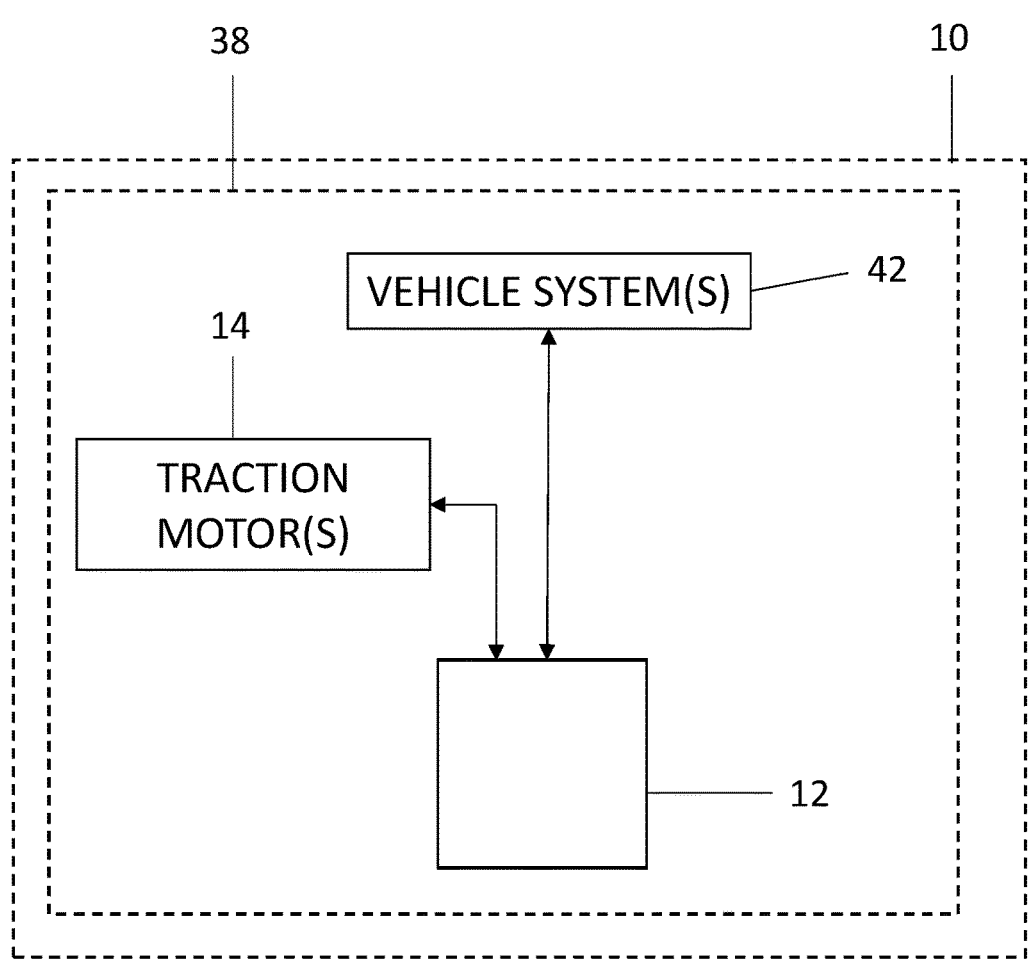
FIG. 3 schematically illustrates an example of a system.

Examples of the present disclosure relate to controlling electrical power consumption from energy storage means by a traction motor of a vehicle caused by a wheel slip event.

In examples, the energy storage means can be any suitable energy storage means to power one or more electric traction motors or traction motors of the vehicle to propel the vehicle.

In examples, the energy storage means can be considered: one or more components configured to store energy, energy storage circuitry, energy storage apparatus, energy storage mechanism and so on.

In examples, the energy storage means comprises or is one or more traction batteries which may be one or more high voltage batteries.

In examples, an electrical power consumption limit is determined and torque provision of the traction motor controlled in dependence on a torque request and the electrical power consumption limit.

For example, it can prevent power consumption in excess of the capability of the battery. This can, therefore, prevent battery damage and/or intrusive battery protection features of a vehicle being activated.

One or more of the features discussed in relation to FIGS. 1, 2A, 2B and 3 can be found in the other figures.

FIG. 1 illustrates an example of a vehicle 10 in which embodiments of the invention can be implemented. In the illustrated example, the vehicle 10 is a hybrid electric vehicle (HEV).

In some, but not necessarily all, examples, the vehicle 10 is a passenger vehicle, also referred to as a passenger car or as an automobile. In other examples, embodiments of the invention can be implemented for other applications, such as industrial vehicles.

In examples, the hybrid electric vehicle has an electric only mode of propulsion among other modes of propulsion. In examples, the HEV is configured to operate as a parallel HEV. Parallel HEVs comprise a torque path between the engine and a least one vehicle wheel, as well as a torque path between an electric traction motor and at least one vehicle wheel. The torque path(s) may be disconnectable via a torque path connector such as a clutch. Parallel HEVs differ from series HEVs, because in series HEVs the purpose of the engine is to generate electrical energy and there is no torque path between the engine and the vehicle wheels.

The vehicle 10 comprises at least one traction motor 14, energy storage means 16 and a control system 12 as described herein. The control system 12 is configured to operate as described herein.

Accordingly, FIG. 1 illustrates a vehicle 10 comprising a control system 12 as described herein.

FIG. 2A illustrates an example of a control system 12.

In the illustrated example, the control system 12 is a control system 12 for controlling electrical power consumption from energy storage means 16 by a traction motor 14 of a vehicle 10 caused by a wheel slip event.

In examples, any suitable control system 12 for controlling electrical power consumption from energy storage means 16 by a traction motor 14 of a vehicle 10 caused by a wheel slip event can be used.

The control system 12 of FIG. 2A comprises an electronic controller 18. In other examples, the control system 12 comprises a plurality of electronic controllers 18 on-board and/or off-board the vehicle 10.

The electronic controller 18 of FIG. 2A comprises at least one electronic processor 24 and at least one electronic memory device 28 coupled to the at least one electronic processor 24 and having instructions 31 (for example a computer program) stored therein, the at least one electronic memory device 28 and the instructions 31 configured to, with the at least one electronic processor 24, cause any one or more of the method or methods described herein to be performed.

Accordingly, FIG. 2A illustrates a control system 12 for controlling electrical power consumption from energy storage means 16 via a traction motor 14 of a vehicle 10 caused by a wheel slip event, the control system 12 comprising one or more electronic controllers 18, the one or more electronic controllers 18 configured to:

receive a torque request 616 for the traction motor 14;

determine a prevailing speed value of the traction motor 14;

determine a maximum allowable increase in the speed of the traction motor 14 to occur during a latency period associated with the prevailing speed value of the traction motor 14;

determine an electrical power consumption limit 606 in dependence on the torque request 616, the prevailing speed value of the traction motor 14 and the maximum allowable increase in speed of the traction motor 14; and control torque provision of the traction motor 14 in dependence on the torque request 616 and the electrical power consumption limit 606.

Furthermore, FIG. 2A therefore illustrates a control system 12, wherein the one or more controllers 18 collectively comprise:

at least one electronic processor 24 having an electrical input for receiving information associated with a torque request 616 for the traction motor 14 of the vehicle 10, determining a prevailing speed value of the traction motor 14, determining a maximum allowable increase in speed of the traction motor 14 and determining an electrical power consumption limit 606; and at least one electronic memory device 28 electrically coupled to the at least one electronic processor 24 and having instructions 31 stored therein; and wherein the at least one electronic processor 24 is configured to access the at least one memory device 28 and execute the instructions 31 thereon so as to cause the control system 12 to determine a prevailing speed value of the traction motor 14, determine a maximum allowable increase in speed of the traction motor 14, determine an electrical power consumption limit 606 and control torque provision of the traction motor 14.

In examples the prevailing speed value can be considered to be the current speed value of the traction motor 14 received or known by the control system 12 or a controller 18 of the control system 12.

FIG. 2B illustrates a non-transitory computer readable storage medium 40 comprising the instructions 31 (computer software).

Figure 4:
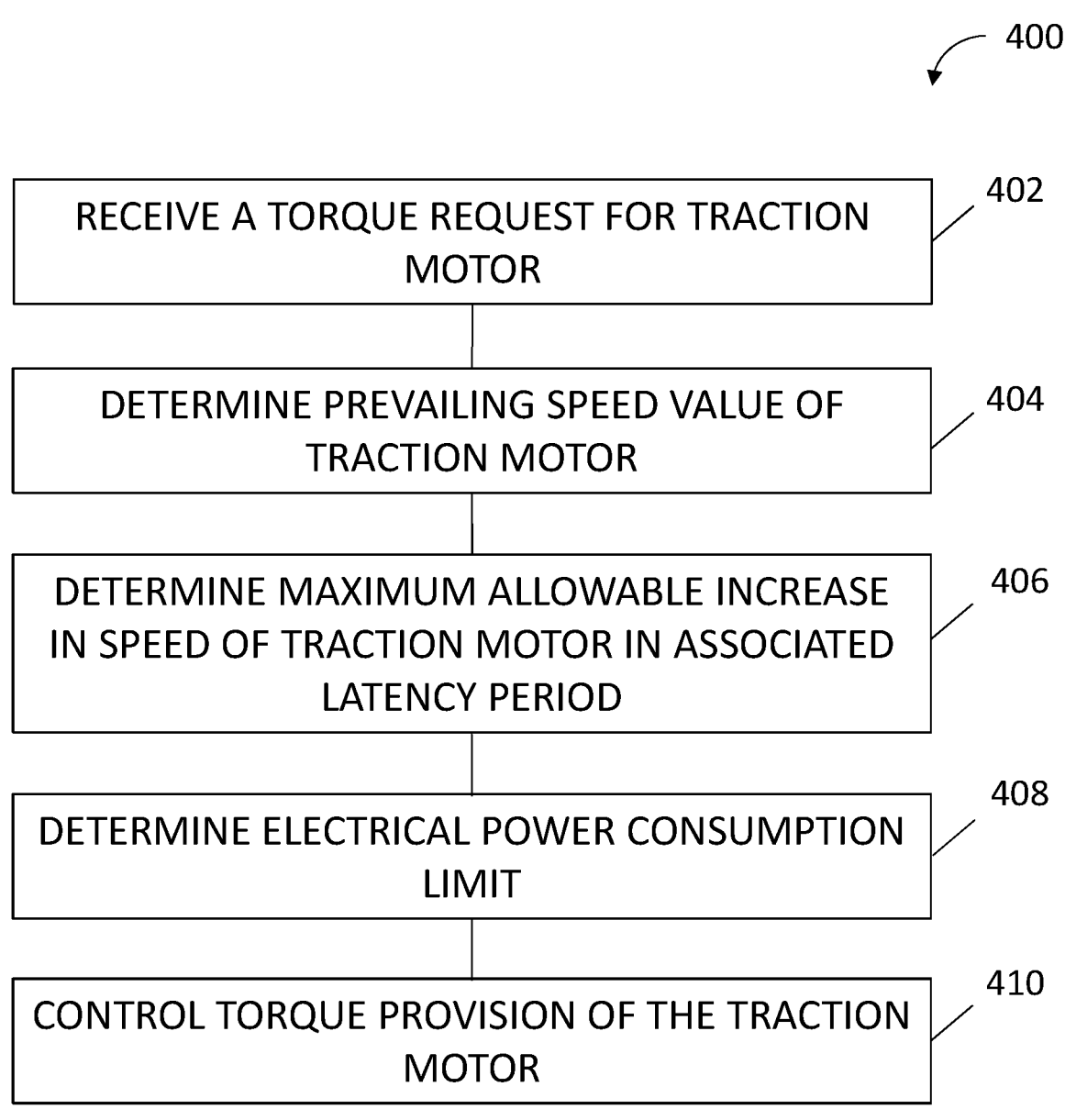
FIG. 4 illustrates an example of a method.

Accordingly, FIG. 2B illustrates a non-transitory computer readable medium 40 comprising computer readable instructions 31 that, when executed by a processor 24, perform the method of FIG. 4 and/or as described herein.

FIG. 3 schematically illustrates an example of a system 38. The system 38 can be considered a vehicle system 38.

In the illustrated example, the system 38 is a system 38 for controlling electrical power consumption from energy storage means via a traction motor 14 of a vehicle 10 caused by a wheel slip event.

In the example of FIG. 3, the system 38 comprises a control system 12 which may be as described in relation to FIG. 2A.

FIG. 3 also illustrates an example of a vehicle 10, such as a hybrid electric vehicle, comprising a control system 12 as described herein or a vehicle system 38 as described herein.

In the example of FIG. 3, the vehicle system 38 comprises one or more traction motors 14 and one or more vehicle systems 42. The one or more vehicle systems 42 can be considered one or more further vehicle system(s) 42.

In the example of FIG. 3, the control system 12 provides means for controlling operation of the system 38. However, in examples, any suitable means for controlling operation of the system 38 can be used.

The control system 12 of FIG. 3 may comprise one or more of: a hybrid powertrain control module; an engine control unit; a transmission control unit; a traction battery management system; and/or the like.

As illustrated in the example of FIG. 3, the elements 14 and 42 are operationally coupled to the control system 12 and any number or combination of intervening elements can exist between them (including no intervening elements).

In some examples, the elements 14 and 42 are operationally coupled to each other and/or share one or more components. Additionally, or alternatively, the element 14 and/or 42 may be operationally coupled to and/or share one or more components with other elements not illustrated in the example of FIG. 3.

In examples, the one or more traction motor motors 14 can comprise or be any suitable traction motor(s) 14.

In some examples, the traction motor(s) 14 may be an alternating current induction motor or a permanent magnet motor, another type of motor or a combination thereof.

In examples, any suitable traction motor(s) 14 suitable for providing torque to drive one or more wheels of the vehicle 10 can be used. In examples, the traction motor(s) 14 is configured to enable at least an electric vehicle mode comprising electric only driving.

In some examples, a traction motor 14 can be considered an electric driver unit or electric traction motor.

In some examples, the traction motor(s) 14 is configured to drive an electric only axle of vehicle 10 to enable all-wheel drive of the vehicle 10 in combination with a second axle driven by an internal combustion engine.

In examples, the control system 12 provides means to control, at least in part, directly or indirectly, operation of the traction motor(s) 14. Information may be transmitted between the control system 12 and the traction motor(s). For example, control information may be transmitted from the control system 12 to the traction motor(s) 14 and/or information from the traction motor(s) 14 transmitted to the control system 12.

This is illustrated in the example of FIG. 3 by the double headed arrow linking the traction motor(s) 14 and the control system 12.

In examples, the one or more vehicle systems 42 are or comprise any suitable vehicle system(s) 42 of the vehicle 10. For example, the one or more vehicle systems 42 may comprise any suitable vehicle system(s) 42 of the vehicle 10, controllable, at least in part, directly or indirectly, by the control system 12.

In examples, the one or more vehicle systems 42 may be considered further vehicle systems in the vehicle system 38.

In some examples, the one or more vehicle systems 42 may be considered to be further vehicle system(s) 42 separate from, but controlled, at least in part, directly or indirectly, by the vehicle system 38.

The one vehicle systems 42 can comprise any suitable vehicle system or systems 42 from which a torque request 616 for the traction motor(s) 14 can be received.

For example, a torque request 616 may come from a physical driver of the vehicle 10, that is a person who interacts with one or more accelerator controls of the vehicle 10, and/or one or more virtual drivers of the vehicle 10.

In examples, virtual drivers can form at least part of any driver assistance system such as one or more advanced driver assistance systems (ADAS), for example, a cruise control system, an autonomous cruise control system, park assist, an all-terrain progress control system (ATPC), all-surface progress control (ASPC), vehicle speed limiter, intelligent speed limiter and so on. An example of all-terrain progress control system (ATPC) or all-surface progress control (ASPC) is described in GB2507622.

In examples, the one or more vehicle systems 42 comprise electrical energy storage means 16 configured to store electrical power for the traction motor(s) 14.

In examples, the energy storage means 16 comprises or is one or more traction batteries (not illustrated). The traction battery or batteries provide a nominal voltage required by electrical power users such as the traction motor(s) 14.

In examples, the traction motor(s) 14 is configured to receive electrical energy from the traction battery of the vehicle system(s) 42.

The traction battery may be a high voltage battery. High voltage traction batteries provide nominal voltages in the hundreds of volts. The traction battery may have a voltage and capacity to support electric only driving for sustained distances. The traction battery may have a capacity of several kilowatt hours to maximize range. The capacity may be in the tens of kilowatt hours, or even over a hundred kilowatt hours.

In examples, the function of the traction battery can be implemented using a plurality of small traction batteries in different locations on the vehicle 10.

Accordingly, FIG. 3 also illustrates a vehicle system 38 comprising a control system 12 as described herein, a traction motor 14 and energy storage means 16.

In examples, the vehicle system(s) 42 provides one or more inverters for each traction motor 14.

In examples, the control system 12 provides means to control, at least in part, directly or indirectly, of the one or more vehicle systems 42. Information may be transmitted between the control system 12 and the one or more vehicle systems 42. For example, control information may be transmitted from the control system 12 to the one more vehicle systems 42 and/or information from the one or more vehicle systems 42, such as one or more torque requests 616, transmitted to the control system 12.

This is illustrated in the example of FIG. 3 by the double headed arrow linking the one or more vehicle systems 42 and the control system 12.

In examples, the control system 12 provides means for controlling the elements of the vehicle system 38. The control system 12 may be configured to control the elements of the vehicle system 38 using one or more wired or wireless network systems/protocols. For example, USB, HDMI, Bluetooth, WiFi, CAN, LIN, I2C, FNET, FBD-LINK, UART, SBI, Flexray and so on may be used.

The vehicle system may comprise any number of additional elements not illustrated in the example of FIG. 3. Additionally, or alternatively, one or more elements of the vehicle system 38 illustrated in the example of FIG. 3 may be integrated and/or combined. For example, one or more of the vehicle systems 42 and the traction motor(s) 14 may be at least partially combined.

In some examples, one or more of the elements illustrated in the example of FIG. 3 may be omitted from the vehicle system 38.

FIG. 4 illustrates an example of a method 400. The method 400 is for controlling electrical power consumption from energy storage means 16 by a traction motor 14 of a vehicle 10 caused by a wheel slip event.

In examples, the vehicle 10 can be a vehicle 10 as illustrated in FIGS. 1 and/or 3.

In examples, the method 400 is performed by the control system 12 of FIG. 2A or 3 and/or as described herein or the vehicle system 38 of FIG. 3 and/or as described herein.

That is, in examples, the control system 12 described herein comprises means for performing the method 400. However, any suitable means can be used to perform the method 400.

In examples, the method 400 can be considered a computer implemented method 400.

The method 400 is for controlling electrical power consumption from energy storage means 16 by a traction motor 14 of a vehicle 10 caused by a wheel slip event, the method 400 comprising:

receiving a torque request 616 for the traction motor 14 of the vehicle 10;

determining a prevailing speed value of the traction motor 14;

determining a maximum allowable increase in speed of the traction motor 14 to occur during a latency period associated with the prevailing speed value of the traction motor 14;

determining an electrical power consumption limit 606 in dependence on the torque request 616, the prevailing speed value of the traction motor 14 and the maximum allowable increase in speed of the traction motor 14; and controlling torque provision of the traction motor 14 in dependence on the torque request 616 and the electrical power consumption limit 606.

At block 402, the method 400 comprises receiving a torque request 616 for the traction motor 14 of the vehicle 10.

Any suitable method for receiving a torque request 616 for the traction motor 14 of the vehicle 10 can be used.

For example, the torque request 606 can be received in any suitable way.

In some examples, the control system 12 receives one or more signals comprising information indicative of the torque request 606. For example, the control system 12 can receive one or more signals comprising information indicative of the torque request 606 from one or more of the vehicle systems 42 of FIG. 3.

That is, in examples, the torque request 606 can be received by the control system 12 in dependence on a demand from a driver and/or virtual driver of the vehicle 10.

At block 404, the method 400 comprises determining a prevailing speed value of the traction motor 14.

Any suitable method for determining a prevailing speed value of the traction motor 14 can be used.

In examples, the prevailing speed value of the traction motor 14 is received by the control system 12 from the traction motor 14. The prevailing speed value of the traction motor 14 can be provided in any suitable way and/or in any suitable format. In some examples, the prevailing speed value of the traction motor 14 can be provided in terms of revolutions per minute (RPM).

In examples, there can be a lag in receiving the prevailing speed value of the traction motor 14 at the control system 12 compared to the actual, current, instantaneous speed value of the traction motor 14.

For example, there can be a delay in the information concerning the speed value of the traction motor 14 reaching the control system 12 and therefore the actual, instantaneous speed value of the traction motor 14 can change during the delay period.

Accordingly, the speed value of the traction motor 14 received at the control system 12 can be considered a prevailing speed value as the actual, instantaneous speed value of the traction motor 14 can have changed since the received information was transmitted. It can therefore be understood that the prevailing speed value of the traction motor 14 has an associated latency period and that in the associated latency period the actual, instantaneous speed value of the traction motor 14 can change.

In examples, the latency period of the prevailing speed value of the traction motor 14 is approximately 50 to 100 milliseconds.

In some examples, the latency period of the prevailing speed value of the traction motor 14 is approximately 70 to 90 milliseconds.

In examples, the control system 12 comprises multiple electronic controllers 18. In such examples, one or more electronic controllers 18 can be responsible for and/or associated with one or more actions and/or controls.

In some examples, one or more controllers 18, responsible for determining available torque for a prevailing speed value of the traction motor 14 can be separate from the one or more controllers 18 responsible for controlling the traction motor 14. See, for example, FIG. 5.

In such examples, a delay can be introduced in providing information from the traction motor 14 to the controller(s) 18 responsible for determining available torque and passing control information to controller(s) 18 responsible for controlling the traction motor 14.

In such examples, this can result in the prevailing speed value known by the controller(s) 18 responsible for determining available torque having an associated latency period.

At block 406, the method 400 comprises determining a maximum allowable increase in speed of the traction motor 14 to occur during a latency period associated with the prevailing speed value of the traction motor 14.

Any suitable method for determining a maximum allowable increase in the speed of the traction motor 14 to occur during the latency period associated with the prevailing speed value of the traction motor 14 can be used.

In examples, determining a maximum allowable increase in speed of the traction motor 14 to occur during the latency period comprises determining the increase in speed of the traction motor that is feasible during the latency period without wheel slip or including an acceptable amount of wheel slip.

That is, in examples, determining a maximum allowable increase in speed of the traction motor 14 to occur during the latency period comprises determining an allowable increase in speed of the traction motor 14 during the latency period without causing unwanted wheel slip.

The maximum allowable increase in speed of the traction motor 14 to occur during the latency period associated with the prevailing speed value of the traction motor 14 can be determined in dependence on any suitable factor or factors.

For example, mass of vehicle, mass and rotational inertia of traction motor, vehicle speed, capability of traction motor, gradient, vehicle road load such as aero losses and/or rolling losses, gear, tyres and/or tyre size and so on can be considered.

In some examples, one or more of the factors can be considered consistent and variables such as vehicle speed and gradient could be taken into account as well as a driver demand influence on the maximum expected acceleration. In some examples, only a single factor such as vehicle speed, or equivalent traction motor speed, can be taken into account.

In some examples, the maximum allowable increase in speed of the traction motor 14 can be determined in dependence on the prevailing speed of the vehicle 10.

Accordingly, in examples, determining a maximum allowable increase in speed of the traction motor 14 comprises determining a prevailing speed of the vehicle 10 and determining the maximum allowable increase in speed of the traction motor in dependence on the prevailing speed of the vehicle 10.

Any suitable method for determining a prevailing speed of the vehicle 10 can be used. In some examples vehicle speed is derived as the average of the wheel speed sensors. Fault handling can be used to allow, for example, use of replacement values if use of the average of the wheel speed sensors is no longer appropriate.

In some examples, the prevailing speed of the vehicle 10 is determined by taking an average value from the wheel speed sensors associated with each road wheel of the vehicle 10. The average wheel speed may be compared with the highest and/or lowest wheel speed value from the sensors, to determine whether a wheel slip event is taking place. A further comparison may be made between signals received from wheel speed sensors and signals received from a vehicle mounted inertial measurement unit (IMU). The IMU may comprise an array of accelerometers arranged to determine the acceleration of the vehicle body in the longitudinal, vertical and lateral directions. If a sudden change in wheel speed is detected but there is no corresponding change in vehicle body acceleration, then that may be indicative of a wheel slipping.

In examples, a latency period can also exist with regard to the vehicle speed. However, in practice vehicle speed does not change quickly enough for the associated latency period to cause a significant error in the determination of the maximum allowable increase in speed of the traction motor 14.

In examples, any suitable method for determining the maximum allowable increase in speed of the traction motor 14 in dependence on the prevailing speed of the vehicle 10 can be used.

For example, the prevailing speed of the vehicle 10 can be used as an input into one or more functions which provide, as an output, the maximum allowable increase in speed of the traction motor 14.

In examples, the function can comprise any number of further inputs and/or outputs. In examples, any suitable inputs can be used in determining the maximum allowable increase in speed of the traction motor 14.

In some examples, determining a maximum allowable increase in speed of the traction motor 14 comprises accessing at least one data structure in dependence on the prevailing speed of the vehicle 10.

In such examples, the at least one data structure can comprise any suitable form or forms and can be used in any suitable way.

In some examples, the at least one data structure can take the form of and/or represent a lookup table that can be accessed in dependence on the prevailing speed of the vehicle 10.

Accordingly, in examples, determining a maximum allowable increase in speed of the traction motor 14 comprises accessing a lookup table using the prevailing speed of the vehicle 10.

In some examples, the maximum allowable increase in speed of the traction motor 14 can be determined in terms of a maximum change in revolutions per minute of the traction motor during the latency period associated with the prevailing speed value of the traction motor 14.

In examples, the at least one function, at least one data structure, such as at least one lookup table, can be determined using any suitable method. For example, the formula and/or data structure can be determined experimentally and/or using one or more models and so on.

In examples, the latency period of the prevailing speed value of the traction motor 14 is approximately 50 to 100 milliseconds.

However, in examples any suitable latency period can be accommodated in dependence on, for example, information flow to/from the control system 12.

At block 408, the method 400 comprises determining an electrical power consumption limit 606 in dependence on the torque request 616, the prevailing speed value of the traction motor 14 and the maximum allowable increase in speed of the traction motor 14.

Any suitable method for determining an electrical power consumption limit 606 in dependence on the torque request 616, the prevailing speed value of the traction motor 14 and the maximum allowable increase in speed of the traction motor 14 can be used.

In examples, determining an electrical power consumption limit 606 comprises determining the maximum predicted speed of the traction motor 14 in the latency period by adding the maximum allowable increase in speed of the traction motor 14 to the prevailing speed value of the traction motor 14 and estimating the predicted electrical power consumption of the traction motor 14 at that maximum allowable speed.

In examples, determining an electrical power consumption limit 606 comprises using one or more functions in dependence on the torque request, prevailing speed value of the traction motor 14 and determined maximum allowable increase in speed of the traction motor 14.

For example, the torque request 616, the prevailing speed value of the traction motor 14 and the determined maximum allowable increase in speed of the traction motor during the latency period can be used as inputs into one or more functions which provide as an output an electrical power consumption limit 606.

In examples, the function can comprise any number of further inputs and/or outputs. In examples, any suitable inputs can be used in determining an electrical power consumption limit 606.

In examples, determining an electrical power consumption limit 606 comprises accessing at least one data structure in dependence on the torque request, prevailing speed value of the traction motor and the maximum allowable increase in speed of the traction motor 14.

In examples, determining an electrical power consumption limit 606 comprises accessing at least one data structure in dependence on the torque request 616 and the maximum predicted speed of the traction motor 14 during the latency period, the maximum predicted speed determined from the prevailing speed value of the traction motor 14 and the determined maximum allowable increase in speed of the traction motor 14 during the latency period.

In such examples, the at least one data structure can comprise any suitable form or forms and can be used in any suitable way.

The at least one data structure can represent and/or take the form of a lookup table that can be accessed in dependence of the torque request 616, prevailing speed value of the traction motor 14 and the maximum allowable increase in speed of the traction motor 14.

Accordingly, in examples, determining an electrical power consumption limit 606 comprises accessing a lookup table using the torque request 616, prevailing speed of the traction motor 14 and the maximum allowable increase in speed of the traction motor 14.

In examples, the at least function and/or at least one data structure for determining an electrical power consumption limit 606 accounts for efficiencies in provision of torque by the traction motor 14.

That is, in examples, determining an electrical power consumption limit 606 comprises accounting for efficiencies in provision of torque by the traction motor 14.

The electrical power consumption limit 606 can be determined in any suitable form.

In examples, the electrical power consumption limit 606 comprises a limit in terms of electrical current and/or power to be supplied to the traction motor In examples, the electrical power consumption limit 606 comprises a limit in terms of electrical current and/or power to be drawn from the energy storage means 16 by the traction motor 14.

In examples, the at least one function, at least one data structure, such as at least one lookup table, can be determined using any suitable method. For example, the formula and/or data structure can be determined experimentally and/or using one or more models and so on.

In some examples it is ensured that the electrical power consumption limit 606 takes into account ancillaries and/or other traction motor usage.

At block 410, the method 400 comprises controlling torque provision of the traction motor 14 in dependence on the torque request 616 and the electrical power consumption limit 606.

Any suitable method for controlling torque provision of the traction motor 14 in dependence on the torque request 616 and the electrical power consumption limit 606 can be used.

In examples, the traction motor 14 is controlled to provide the requested torque limited by the electrical power consumption limit 606.

For example, the traction motor 14 can be controlled to provide the requested torque until the electrical power consumption limit 606 is reached after which the torque provided by the traction motor 14 is limited to prevent the electrical power consumption limit 606 being exceeded, such as during a wheel slip event.

In examples, controlling torque provision of the traction motor 14 comprises providing one or more signals comprising information to the traction motor 14 to control the traction motor 14.

In examples, controlling torque provision comprises transmitting the torque request 616 and electrical power consumption limit 606 to control torque provision.

For example, a first controller or controllers 18a can perform blocks 402 to 408 of method 400 and can transmit the torque request 616 and electrical power consumption limit 606 to a further controller or controllers 18b configured to control the traction motor 14. See, for example, FIG. 5.

In examples, controlling torque provision comprises determining a speed value of the traction motor 14 having a lower associated latency and determining a torque limit in dependence on the lower latency speed value of the traction motor, the torque request 616 and the electrical power consumption limit 606.

For example, when the torque request 616 and electrical power consumption limit 606 are transmitted from a first controller or controllers 18a to a different controller or controllers 18b to control the traction motor 14 the further or different controller or controllers 18b may have access to a speed value of the traction motor 14 having a lower associated latency.

For example, the different or second controller or controllers 18b may be closer to the traction motor 14 and therefore the speed of the traction motor 14 may be determined at the different or second controller or controllers 18 with less lag or a lower latency period.

In such examples, the different or second controller or controllers 18b can determine a speed value of the traction motor 14 having a lower associated latency and determine a torque limit, for torque to be provided by the traction motor 14, in dependence on the lower latency speed value of the traction motor 14, the torque request 616 and the electrical power consumption limit 606.

In examples, determining a torque limit comprises using a model of the electrical power to torque conversion of the traction motor 14 to calculate the torque limit using the value of speed of the traction motor having the lower associated latency.

Any suitable model can be used. In some examples, the torque limit can be applied directly in current and in such examples no conversion of the limit is performed.

The control system 12 can limit the requested torque using the determined torque limit if the electrical power consumption limit 606 will be exceeded, such as during a wheel slip event.

A technical effect of the method 400 is that a limit can be placed on electrical power consumption preventing traction battery damage and/or use of intrusive battery protection features when a wheel slip event occurs.

Additionally, or alternatively, in some examples, closed loop control is provided within a single controller which obviates issues with network latency.

Figure 5:
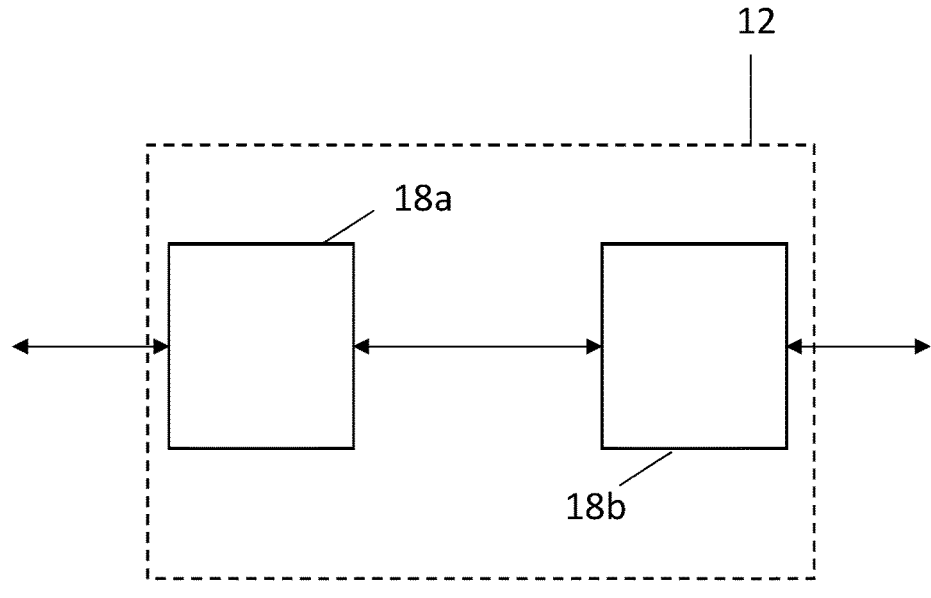
FIG. 5 illustrates an example of a control system.

FIG. 5 illustrates an example of a control system. The control system 12 of FIG. 5 can be as described in relation to FIG. 2A and/or FIG. 3.

In examples, the control system 12 of FIG. 5 is configured to perform the method of FIG. 4 and/or as described herein.

In the example of FIG. 5, the control system 12 comprises two controllers 18a, 18b. However, in some examples the control system can comprise any suitable number of controllers 18.

In the example of FIG. 5, the first and second controllers 18a, 18b are configured to perform different parts of the method 400. Accordingly, it can be considered, in examples, that in the example of FIG. 5 the first and second controllers 18a, 18b are responsible for different parts of the method 400.

In the example of FIG. 5, information can flow to and from the first and second controllers 18a and 18b and between the first and second controllers 18a and 18b as illustrated by the double headed arrows in FIG. 5.

In the example of FIG. 5, the first controller 18a is configured to perform, at least, blocks 402 to 408 of the method 400 of FIG. 4.

However, in the example of FIG. 5, controller 18b is configured to perform, at least, block 410 and is therefore configured to control provision of torque by the traction motor or motors 14. In some examples, the controller(s) 18b can be an inverter.

Accordingly, the first controller 18a has a prevailing speed value of the traction motor 14 having a larger associated latency period than the second controller 18b which is closer to the traction motor 14.

Therefore, in the example of FIG. 5, the controller 18a, configured to perform blocks 402 to 408 of FIG. 4 and provide the control information to controller 18b to control torque provision from the traction motor 14 can do so while implementing closed loop control at the controller 18b despite the latency period associated with the speed value of the traction motor 14 accessible at the controller 18a.

It can be seen, therefore, in the example of FIG. 5 that by using the inventive method 400 described herein power spikes from a traction battery can be avoided during a wheel slip event.

This is because an electrical power consumption limit 606 is used to limit the torque provided to prevent excessive power being drawn from a traction battery due to a wheel accelerating quickly during a latency period of the speed value of the traction motor 14 known by controller 18a.

Figure 6:
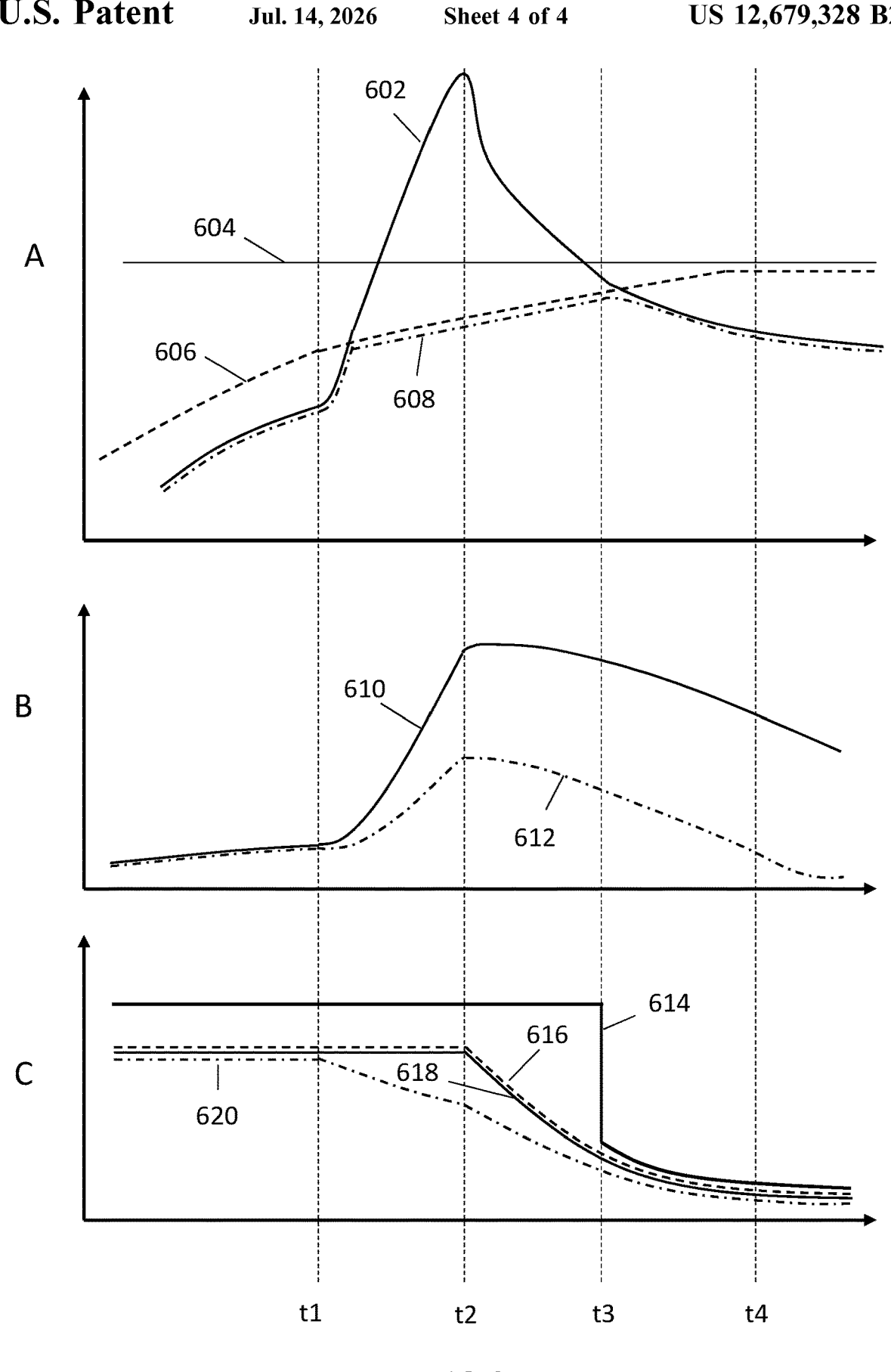
FIG. 6 illustrates an example of controlling electrical power consumption from energy storage means by a traction motor of a vehicle caused by a wheel slip event.

FIG. 6 illustrates an example of controlling electrical power consumption from energy storage means 16 by a traction motor 14 of a vehicle 10 caused by a wheel slip event.

In examples, the vehicle 10 is the vehicle illustrated in FIG. 1 or FIG. 3.

The example of FIG. 6 is split into three sections, an upper section A, a middle section B. and a lower section C. The upper section of FIG. 6 can therefore be considered FIG. 6A, the middle section of FIG. 6 can be considered FIG. 6B and the lower section of FIG. 6 can be considered FIG. 6C.

FIG. 6A illustrates traction motor current as a function of time.

FIG. 6B illustrates traction motor speed as a function of time.

FIG. 6C illustrates traction motor torque as a function of time.

Also illustrated in FIG. 6 are four times t1, t2, t3 and t4 which are common to FIGS. 6A, 6B and 6C.

In FIG. 6C, a torque request for the traction motor 14 is illustrated by dashed line 616. It can be seen In FIG. 6C that the torque request is constant up until time t2.

In FIG. 6A the traction motor current without use of the inventive method described herein is illustrated by the solid line 602.

Before time t1 the current 602 drawn by the traction motor 14 increases in line with the increasing speed of the traction motor 14 due to the torque request 616.

However, at time t1 there is a wheel slip event and the speed of the traction motor 14 increases rapidly as illustrated by the solid line 610 in FIG. 6B.

It can be seen that between times t1 and t2 the current 602 drawn by the traction motor 14 increases rapidly and passes above the battery discharge current limit illustrated by the solid horizontal line labelled 604.

Accordingly, without the inventive method described herein, repeated exposure to events such as these may lead to battery damage.

In the example of FIG. 6, at time t2, implausible wheel acceleration is determined and therefore the torque request 616 is limited. This can be seen in FIG. 6C by the torque request 616 reducing between times t2 and t3.

Accordingly, the current 602 drawn by the traction motor 14 also reduces between times t2 and t3 passing below the battery discharge current limit 604 around time t3.

The corresponding speed 610 of the traction motor 14 also reduces during times t2 and t3.

At time t3 the wheel slipping event is detected by a system of the vehicle 10, such as a stop control system, and further torque intervention 614 is then applied.

This can be seen in FIG. 6C as between times t3 and t4 the torque request 616 is further limited and, in FIG. 6A the current 602 by the traction motor 14 also further reduces.

Similarly, in FIG. 6B, the corresponding speed 610 of the traction motor 14 also continues to reduce between times t3 and t4.

The torque provided by the traction motor 14 in this example is illustrated in FIG. 6C by the solid line labelled 618. The torque provided 618 without the method described herein follows the torque request 616.

It can be therefore seen in the example of FIG. 6 that a wheel slip event can, without the inventive method described herein, can lead to unnecessarily large power drawn from a traction battery, for example.

Also illustrated in the example of FIG. 6 is an example of applying the inventive electrical power consumption control described herein.

In this example, the torque request 616 in FIG. 6C remains the same. The current drawn in this case is illustrated by the dot-dashed line 608 and it can be seen that prior to time t1 the current 608 matches the current 602 drawn without using the method described herein. However, in the example of FIG. 6A the lines 602 and 608 have been offset slightly for the purpose of illustration.

At time t1 the current 608 drawn while using the method described herein also increases after the wheel slip event but is limited by the electrical consumption power limit 606 shown as a dashed line in FIG. 6A.

It can therefore be seen that the electrical current drawn 608 rises sharply but then is prevented from exceeding the electrical consumption power limit 606. This also, therefore, prevents the battery discharge current limit 604 from being exceeded.

The corresponding traction motor speed is illustrated in FIG. 6B by the dot-dashed line 612. It can be seen that the speed 612 of the traction motor 14 does not increase as much as the speed 610 without the method described herein.

The current 608 drawn by the traction motor 14 continues to follow the electrical consumption power limit 606 until time t3 in which intervention 614 further limits the torque provided.

The associated torque provided by the traction motor 14 is shown by the dot-dashed line 620 in FIG. 6C.

It can be seen in FIG. 6C that, for the example using the method described herein, the torque provided by the traction motor 14, compared to the torque requested, is limited between times t1 and t3 compared to the case (line 618 in FIG. 6C) where the inventive method described herein is not used. This is illustrated by the hashed area in FIG. 6C.

As used herein "for" should be considered to also include "configured or arranged to". For example, "a control system for" should be considered to also include "a control system configured or arranged to".

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in the FIG. 4 may represent steps in a method and/or sections of code in the computer program 31. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling electrical power consumption from energy storage means by a traction motor of a vehicle caused by a wheel slip event, the control system comprising one or more electronic controllers, the one or more electronic controllers configured to:

receive a torque request for the traction motor;
  determine a prevailing speed value of the traction motor;
  determine a maximum allowable increase in speed of the traction motor to occur during a latency period associated with the prevailing speed value of the traction motor, wherein the maximum allowable increase in speed comprises an increase in speed of the traction motor that is feasible during the latency period without wheel slip or including an acceptable amount of wheel slip;
  determine an electrical power consumption limit by:
    determining a maximum predicted speed by adding the maximum allowable increase in speed to the prevailing speed value of the traction motor;
    accessing a data structure using the torque request and the maximum predicted speed to obtain a predicted power consumption; and
    setting the electrical power consumption limit based on the predicted power comsumption; and
  control torque provision of the traction motor in dependence on the torque request and the electrical power consumption limit.

2. The control system of claim 1, wherein the one or more electronic controllers collectively comprise:

at least one electronic processor having an electrical input for receiving information associated with the torque request for the traction motor of the vehicle, determining the prevailing speed value of the traction motor, determining the maximum allowable increase in speed of the traction motor and determining the electrical power consumption limit; and
  at least one electronic memory device electrically coupled to the at least one electronic processor and having instructions stored therein;
  and wherein the at least one electronic processor is configured to access the at least one electronic memory device and execute the instructions thereon so as to cause the control system to determine the prevailing speed value of the traction motor, determine the maximum allowable increase in speed of the traction motor, determine the electrical power consumption limit and control torque provision of the traction motor.

3. The control system of claim 1, wherein determining the maximum allowable increase in speed of the traction motor comprises determining a prevailing speed of the vehicle and determining the maximum allowable increase in speed of the traction motor in dependence on the prevailing speed of the vehicle.

4. The control system of claim 3, wherein determining the maximum allowable increase in speed of the traction motor comprises accessing at least one data structure in dependence on the prevailing speed of the vehicle.

5. The control system of claim 1, wherein determining the electrical power consumption limit comprises accessing at least one data structure in dependence on the torque request, the prevailing speed value of the traction motor and the maximum allowable increase in speed of the traction motor.

6. The control system of claim 5, wherein the at least one data structure accounts for efficiencies in provision of torque by the traction motor.

7. The control system of claim 1, wherein the electrical power consumption limit comprises a limit in terms of electrical current and/or power to be supplied to the traction motor.

8. The control system of claim 1, wherein the electrical power consumption limit comprises a limit in terms of electrical current and/or power to be drawn from the energy storage means by the traction motor.

9. The control system of claim 1, wherein the latency period of the prevailing speed value of the traction motor is approximately 50 to 100 milliseconds.

10. The control system of claim 1, wherein controlling torque provision comprises transmitting the torque request and electrical power consumption limit to control torque provision.

11. The control system of claim 1, wherein controlling torque provision comprises determining a speed value of the traction motor having a lower associated latency and determining a torque limit in dependence on a lower latency speed value of the traction motor, the torque request and the electrical power consumption limit.

12. A vehicle system comprising the control system as claimed in claim 1, a traction motor and energy storage means.

13. A vehicle comprising the control system as claimed in claim 1.

14. A method for controlling electrical power consumption from energy storage means by a traction motor of a vehicle caused by a wheel slip event, the method comprising:

receiving a torque request for the traction motor of the vehicle;
  determining a prevailing speed value of the traction motor;
  determining a maximum allowable increase in speed of the traction motor to occur during a latency period associated with the prevailing speed value of the traction motor, wherein the maximum allowable increase in speed comprises an increase in speed of the traction motor that is feasible during the latency period without wheel slip or including an acceptable amount of wheel slip;
  determining an electrical power consumption limit by:
    determining a maximum predicted speed by adding the maximum allowable increase in speed to the prevailing speed value of the traction motor;
    accessing a data structure using the torque request and the maximum predicted speed to obtain a predicted power consumption; and
    setting the electrical power consumption limit based on the predicted power consumption; and controlling torque provision of the traction motor in dependence on the torque request and the electrical power consumption limit.

15. A non-transitory computer readable medium comprising computer readable instructions that, when executed by a processor, perform the method of one or more of claim 14.

16. A vehicle comprising the vehicle system as claimed in claim 12.

* * * * *